Patented Feb. 21, 1939

2,148,087

UNITED STATES PATENT OFFICE 2,148,087

SULPHONATED TERPENE PRODUCTS AND METHODS FOR THEIR PRODUCTION

Alfred L. Rummelsburg, Wilmington, Del., assignor to Hercules Powder Company, Wilmington, Del., a corporation of Delaware No Drawing. Application April 26, 1937,
Serial No. 139,107

10 Claims. (Cl. 260—512)

This invention relates to sulphonated terpene products and methods for their production, and more particularly to products formed by the sulphonation of mixtures of a polymerized terpene mixture, known as dipolymer, and a higher fatty acid or ester thereof, or aliphatic, aralkyl, or aromatic compounds containing active groups such as —COOH, —COCl, —C=O, —CH=O, —Cl, —OH, —NH$_2$, —CONH$_2$, O=C—O—C=O, or aromatic hydrocarbons, or their substitution products.

In accordance with the present invention, it is found possible to sulphonate mixtures containing fatty acids or their esters, such as castor oil, ricinoleic acid, olein, oleic acid, olive oil, linseed oil, corn oil, stearic acid, palmitic acid, a resin acid such as abietic acid, etc., together with polymerized terpene mixtures, such as light or dark dipolymer, with compounds such as butyl alcohol, laurol, abietyl alcohol, stearol, amyl chlorides, benzyl chloride, naphthols, phenols, cresols, naphthylamines, aniline, acetic anhydride, toluene, benzene or naphthalene, or mixtures of dipolymer, fatty acids, and any of the above mentioned substances, using as condensing and sulphonating agent chlorosulphonic acid, acetylsulphuric acid, or fuming or concentrated sulphuric acid. Dipolymer, as the term is herein employed, is a product consisting of polymerized terpene hydrocarbons and is produced by the polymerization of dipentene, turpentine or pine oil, by various methods, for example, those outlined in the patents to Irwin W. Humphrey, 1,691,065; 1,691,067; 1,691,068; and 1,691,069, dated November 13, 1928. The term is herein used to designate substances of this type. According to its method of production, the dipolymer is known as light or dark dipolymer.

As disclosed in the Rummelsburg and Little United States Patent No. 1,993,415, it is found that dipolymer, or similar polymerized terpene mixtures, may be converted into water-soluble products by treatment with concentrated or fuming sulphuric acid, or chlorosulphonic acid, the product being capable of forming metallic salts. As disclosed in the above patent, both sulphonated dipolymer and its alkali salts are very effective wetting-out agents, and when added to water or aqueous solutions, they enable fibers, powders, or other substances to be wetted more readily than would otherwise be the case.

It is also known that the various fatty esters and acids mentioned above can be sulphonated and used as wetting agents.

However, when the fat, fatty acid, or other substances and polymerized terpenes are mixed together prior to sulphonation, a different product is obtained from that made by mixing the sulphonated products after sulphonation of the two components separately, the unsaturated nature of the polymerized terpenes tending toward their ease of condensation with fats or substituted aliphatic, aromatic or aralkyl hydrocarbons, or the aromatic hydrocarbons themselves, a reaction similar to the Friedel and Crafts reaction probably occurring in the case of aromatic anhydrides, or aralkyl halides in the presence of the sulphonating acid.

Specifically, the new products thus obtained are easier to make than sulphonated dipolymer, are more soluble in water, and are more resistant to decomposition by acids. Both the free sulphonated acid products and their salts obtained by their neutralization, are good emulsifying agents for pine oil, terpineol, hexalin, tetralin, stearol, etc., and other oils used in the textile industry, and are very stable to acids and salts in concentrations up to 5%. Either the acid, or its sodium salt, is miscible with pine oil or terpineol in any proportion, and for certain purposes it is desirable to use the product in solution in pine oil.

For example, a product obtained by treating a mixture of oleic acid and polymerized terpenes with chlorosulphonic acid is more easily handled than a product obtained by sulphonating either oleic acid or dipolymer and, in addition, the vigorous nature of this reaction is greatly lowered, because of a simultaneous condensation reaction which apparently occurs along with sulphonation. The products obtained will, in general, dissolve in water to give clear, soapy solutions, before being neutralized.

The product obtained when using oleic acid and dark dipolymer is an oil containing about 3.0 to 6.5% sulphur and having an acid number of 80–110 and a saponification number of 150–200, and usually contains some water. The iodine value of the acid-terpene mixture before sulphonation is about 113; after sulphonation about 40. The rhodanometric iodine number of the unsulphonated mixture is about 84; after sulphonation about 20.

Example I

To 700 grams of 101% sulphuric acid were added 350 grams of dark dipolymer over a period of one-half an hour, with cooling and stirring, maintaining the temperature at 25° C. Then 100 grams of beta naphthol were added, with stirring, followed by addition of 100 grams of 105% sulphuric acid, the mixture agitated at room temperature for 4 hours, then held at 70° C. for several hours, then cooled, and sufficient water to render the acid 40–50% concentration, separating a viscous product, readily soluble in water, which is washed with 10% common salt solution and neutrallized with 25% caustic soda to give 350–400 grams of a dark colored product possessing high wetting properties. The naphthol may be first mixed with the dipolymer and the mixture added to the sulphonating agent, with equivalent results. Instead of naphthol, phenol or cresol may be used with good results.

The sulphonation may be carried out in an inert solvent, e. g. carbon tetrachloride, and sulphur trioxide or chlorosulphonic acid may be used as the sulphonating agent, at temperatures from 0 to 100° C. Following sulphonation, water may be added to the reaction mixture, the reaction mixture neutralized, the solvent steamed off, the water evaporated, preferably under reduced pressure, leaving the sulphonated product.

*Example II*

A mixture of 10 grams of dipolymer and 5 grams of technical cresols are added to 60 grams of 100% sulphuric acid over a period of 15 minutes, with agitation and cooling at 20 to 40° C., the mixture allowed to stand at room temperature for 48 hours with occasional stirring, then diluted with water to a 40% acid concentration, the viscous oil separated, washed with brine solution, then dissolved in twice its weight of water, and neutralized. The neutralized, sulphonated material may then be salted out by adding gradually increasing quantities of common salt, and drying. Higher sulphonation temperatures and larger quantities of sulphuric acid will increase the reaction rate and give darker colored products. Variations in procedure as in Example I may be employed.

In the above examples, the effect of elevated temperatures is to increase the reaction rate. The same results may be obtained by using room temperatures, but much longer periods of agitation are required. The proportions of components used may be varied, depending upon the nature of the polymerized terpene mixture.

In general, the products obtained have the superior emulsifying and wetting properties indicated above, the calcium, magnesium and similar salts being sufficiently soluble in water and the free or neutral product is soluble in dilute acids, e. g. sulphuric, hydrochloric, acetic, etc. acids, so that the sulphonated derivatives may be used in acid solutions or in hard water.

In certain cases it is found practical to prepare the alkali salts of the sulphonated derivatives by treating the free sulphonic acids with calcium carbonate, filtering, and then treating the solution with alkali carbonate until it is slightly alkaline to litmus, and again filtering. An alkali salt of a sulphonic acid derivative may then be obtained by evaporation.

What I claim is:

1. The process of preparing a sulphonated product which includes reacting with a sulphonating agent a mixture of a polymerized terpene and an aromatic compound selected from the group consisting of naphthols, cresols, and phenols.

2. The process of preparing a sulphonated product which includes reacting a mixture of a polymerized terpene and a phenol with a sulphonating agent.

3. The process of preparing a sulphonated product which includes reacting a mixture of a polymerized terpene and a cresol with a sulphonating agent.

4. The process of preparing a sulphonated product which includes reacting with a sulphonating agent a mixture of a polymerized terpene and a naphthol.

5. The sulphonated product of the sulphonation of a mixture of a polymerized terpene and an aromatic compound selected from the group consisting of naphthols, cresols and phenols.

6. The sulphonated product of the sulphonation of a mixture of a polymerized terpene and a phenol.

7. The sulphonated product of the sulphonation of a mixture of a polymerized terpene and a cresol.

8. The sulphonated product of the sulphonation of a mixture of a polymerized terpene and a naphthol.

9. The process of preparing a sulphonated product which includes reacting with a sulphonating acid, in the presence of an inert solvent, a mixture of a polymerized terpene and an aromatic compound selected from the group consisting of naphthols, cresols and phenols.

10. The process of preparing a sulphonated product which includes reacting with fuming sulphuric acid, in the presence of carbon tetrachloride, a mixture of a polymerized terpene and an aromatic compound selected from the group consisting of naphthols, cresols and phenols.

ALFRED L. RUMMELSBURG.